United States Patent
Madhani et al.

(12)

(10) Patent No.: US 6,463,960 B1
(45) Date of Patent: Oct. 15, 2002

(54) SECONDARY CONDUIT FOR TRANSMISSION CARRIERS

(75) Inventors: Jignesh Madhani, Oakmont, PA (US); Louis V. Nicassio, Pittsburgh, PA (US); Sam Cancilla, Cranberry Township, PA (US)

(73) Assignee: Nicassio Corporation

( * ) Notice: Subject to any disclaimer, the term of this patent is extended or adjusted under 35 U.S.C. 154(b) by 0 days.

(21) Appl. No.: 10/103,108

(22) Filed: Mar. 21, 2002

(51) Int. Cl.[7] ................................................ F16L 55/16
(52) U.S. Cl. ............................ 138/98; 138/115; 174/47
(58) Field of Search .............................. 138/98, 97, 111, 138/115–117, 178, 177; 174/47; 264/36.1, 269; 405/150.1, 154.1; 156/287, 292

(56) References Cited

U.S. PATENT DOCUMENTS

| 4,064,355 A | * | 12/1977 | Neroni et al. ................ 138/115 |
| 4,368,348 A | * | 1/1983 | Eichelberger et al. ...... 138/111 |
| 5,172,730 A | * | 12/1992 | Driver ......................... 138/103 |
| 5,305,798 A | * | 4/1994 | Driver ......................... 138/104 |
| 6,311,730 B2 | * | 11/2001 | Penza .......................... 138/114 |

* cited by examiner

Primary Examiner—Patrick Brinson
(74) Attorney, Agent, or Firm—Cohen & Grigsby, P.C.

(57) ABSTRACT

A secondary conduit for a transmission carrier comprising at least one first arcuate sidewall defining an elongated first conduit, said first conduit providing a means for conveying a fluid, at least one second conduit formed in said at least one first arcuate sidewall, said second conduit being coextensive with said first conduit to define a secondary conduit adapted to receive a transmission carrier.

5 Claims, 2 Drawing Sheets

SECONDARY CONDUIT FOR TRANSMISSION CARRIERS

FIELD OF THE INVENTION

The present invention relates to secondary conduit for transmission carriers and, in particular, to a secondary conduit integrated into a cured in place pipe for carrying electronic or fiber optic transmission cables.

BACKGROUND OF THE INVENTION

It is generally well known that with the advent of broadband communications it has been difficult to locate transmission facilities at existing facility locations. The location of transmission facilities such as metallic and fiber optic cables has required creative solutions. Cable has been hung from existing transmission poles and fiber optic cable has been placed in protective conduit hung from poles as well as in trenches placed along existing highways and rail facilities. In open fields these methods tend to work well and at relatively acceptable costs. However, in cities where the existing infrastructure does not permit trenching of cables or additions to over head wiring, other solutions have been devised.

One such method is the proposed use of sewer lines in which cables can be run through out sewer system. One of the attractive features of such method is that sewers are generally connected to all of the existing building, thus providing ready access to a transmitter's potential customer base. It also obviates the need to destroy streets in order to place trenches and cables in the ground. The methods proposing the use of such systems, insert the conduits inside the sewer or storm pipe with the help of robots, and use anchors, bolts or other fasteners to hold the conduits which carry the optical fiber cable in their required positions. Typically, circular sleeves or rings made of steel, which open inside the pipe, holds itself and the conduits in position.

Notwithstanding the seeming benefits of using these existing sewer line systems, significant problems exist. One of the most significant is that most existing sewer lines are old and in disrepair. The means currently proposed for use and used to place the transmission carriers conduits in the sewer systems accelerate their deterioration and the capital value of the in-sewer placed conduits.

The present invention provides an alternative to the current proposed in-sewer methods by utilizing, in one embodiment, a system well known in the sewer relining art of cured in place pipe ("CIPP"). CIPP is used for the relining of existing sewers. Thus, it is an object of the present invention to provide a novel secondary conduit within the CIPP used for relining deteriorating or old sewer systems. The secondary conduit within the CIPP provides a simple way of placing transmission cables within the infrastructure of cities and enhance the sewer systems. It is thus a further object of the invention to provide a system in which the capital investment of utilizing sewer systems for transmission cables is enhanced. It is another object of the invention to provide for cities facing sewer relining an opportunity to find third party funding sources to help finance such reconstruction or relining by rental of the secondary conduits or providing the CIPP.

SUMMARY OF THE INVENTION

Generally, the present invention provides at least one secondary conduit for a transmission carrier such electrical or optical cable used to transmit signals such as broadband internet signals. The secondary conduits for such carriers are preferably provided as an integral portion of a first conduit that comprises at least one arcuate sidewall which defines the elongated first conduit. The first conduit is typically used for the conveyance of fluids such as water, sewage, or storm water. A second conduit is integrally formed within said one first arcuate sidewalls to form a secondary conduit that is coextensive with the length of the first conduit and is adapted to receive one or more transmission carriers.

In a preferred embodiment of the invention, both the first and second conduits are of a substantially circular cross-section, but can be of other shapes including elliptical, oval or the like. The secondary conduit can be of a different cross-sectional profile from the first conduit and in other preferred embodiments more than the secondary conduits are used, each of which may have a different cross-sectional profile. Most preferably the first conduit is substantially circular in cross-section profile while the secondary conduit has either a substantially circular or oval profile. The secondary conduit typically has a cross-sectional diameter sufficient to provide access to carriers such as optical fiber. In the preferred embodiments of the invention, the inner surfaces of the secondary conduit are of a coefficient of friction sufficiently low to easily pull fiber optics through extended lengths without the necessity of including protective conduit for such cable.

While the invention may be made of pre-formed sections of concrete extrusions or castings, extruded polyethylene or propylene or other material which can be used for conveyance of fluids, the invention has particular advantages in association with cured in place pipe ("CIPP"). CIPP has been used in the construction industry for many years and, in particular, has been used to reline deteriorating sewer and storm sewer systems owned by public authorities and the like. Thus by using CIPP as a preferred embodiment of the present invention, a significant enhancement to the infrastructure of sewer system can be undertake while providing means for providing transmission carriers to buildings without damage to other portions of the municipal infrastructure, such as streets, sidewalks or other parts of the public access.

In one aspect of the invention, a secondary conduit positioned and anchored between the felt layers used to reinforce the first conduit that will be cured in place within and existing sewer or like system. This secondary conduit carrier can be placed or positioned between the layers during or after the manufacturing of the liner. In preferred embodiments, the secondary conduit comprises a rigid or semi-rigid polyethylene liner which may be used to form the secondary conduit and removed after formation or left in place. In another preferred embodiment, the secondary conduit is formed on outside of the CIPP conduit adjacent to the server conduit. Other advantages of the present invention will become apparent from a perusal of the following detailed description of a presently preferred embodiments of the invention-taken in connection with the accompanying drawings.

PRESENTLY PREFERRED EMBODIMENTS

Referring to FIGS. 1 through 4, the present invention 10 comprises a first conduit 11 defined by at least one first arcuate sidewall 12. Arcuate sidewall 12 as shown, defines first conduit 11 with a substantially circular cross-section. In the preferred embodiment using CIPP forming techniques, the profile defined will be essentially that of pipe 13 in which restoration work is undertaken. In most case, such reconstruction takes place in circular sewer lines made of ceramic or concrete materials.

Figure 1:
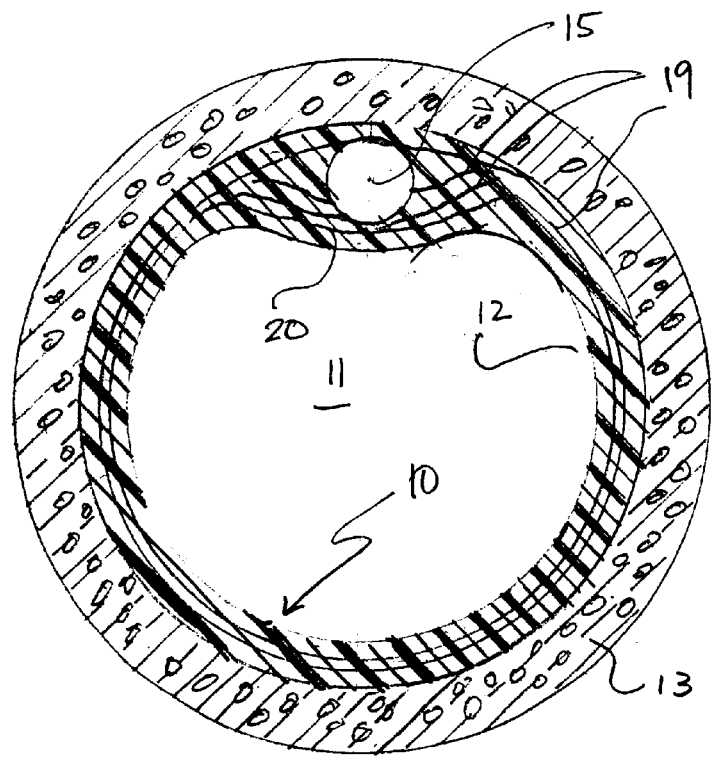
FIG. 1 is a cross-sectional elevation of a single secondary conduit positioned in the arcuate sidewall of a first conduit.
Figure 2:
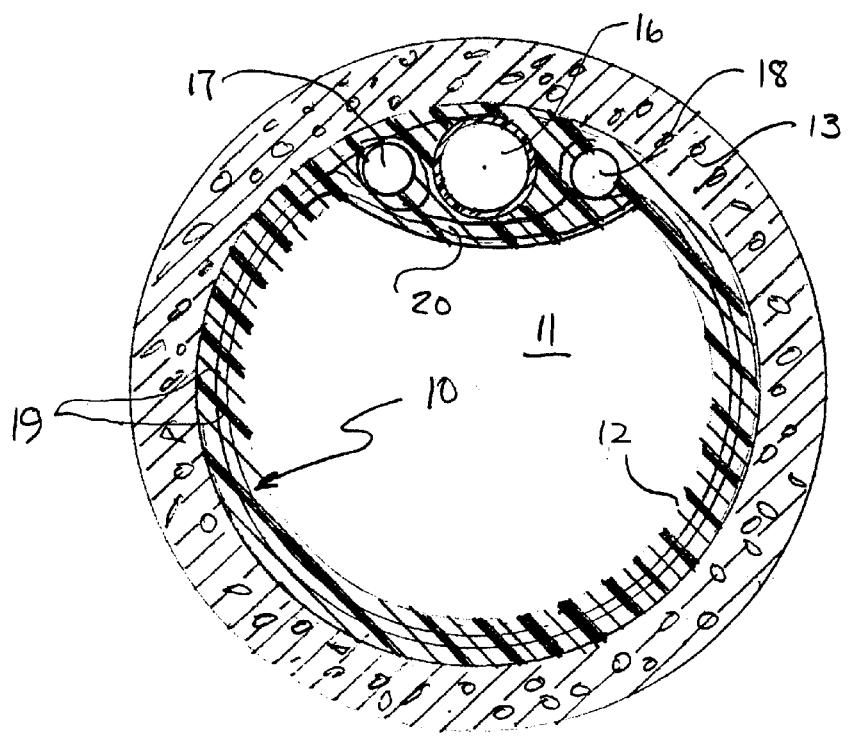
FIG. 2 is a cross-sectional elevation of a plurality of secondary conduits positioned in the arcuate sidewall of a first conduit.

Integrally formed in arcuate sidewall 12 is at least one secondary conduit 15 (FIG. 1) or multiple secondary conduits 16, 17, and 18 shown in FIG. 2. In CIPP forming techniques, sidewall 12 is comprised of layers of adsorbent material such as felt used to receive various curable resins. In a preferred embodiment, additional adsorbent material is positioned adjacent to area 20 where secondary conduit 15 and first conduit 11 are juxtaposed. As can be seen from FIGS. 2 through 4, secondary conduits 16–18 have circular cross-sectional profiles.

Figure 3:
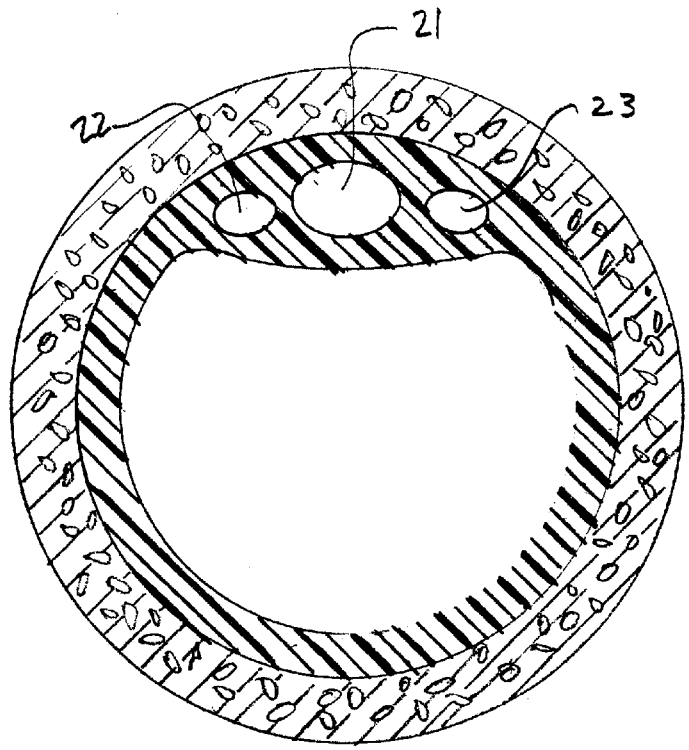
FIG. 3 is a cross-sectional elevation of secondary conduits positioned in the arcuate sidewall of a first conduit having crossectional profiles different from that of the said first conduit.

In FIG. 3, multiple secondary conduits 21, 22 and 23 are shown having oval or elliptical cross-sectional profiles.

A preferred method for producing the secondary conduits of the present invention is the use of cured in place pipe technology used to reline or restore deteriorating sewer lines. There are number of techniques current employed by those skilled in the art and an example on one such method is set forth below to illustrate the present invention.

Most techniques utilize a liner made of adsorbent material such as felt 19. This liner can either be inverted into or pulled through the host sewer 13, or storm pipe. Which installation technique determines where to locate the secondary conduit carrier between the felt layers which are each a concentric unexpanded a flat conduit which will comprise the arcuate sidewall 12 when cured. For purposes of illustration, a description of the formation of a liner of the present invention follows based on the use of the inversion method of liner installation and that secondary conduit 15 is to be positioned after the liner is assembled for insertion.

Generally, a conventional known liner is laid flat outside of the host pipe. The outer most layer incorporates a seam which can be opened to pre-form the secondary conduit (typically a polyurethane coated layer). Opening this outer most layer forms a flat panel exposing inner uncoated felt layer which functions as a flat pipe or tube. A rectangular strip of dry felt, of thickness similar to that of outer coated felt layer is preferably provided for bonding to the dry uncoated layer of previously exposed felt. This strip acts as a reinforcing strip to compensate for any loss of the coated felt layer and helps form a uniform thickness of liner for arcuate sidewall 12. The reinforcing strip is preferably designed with a width sufficient to compensate for any loss of thickness in overall liner dimension. Typically the reinforcing strip is positioned along the center felt layer and heat bonded thereto. Proper placement of the reinforcing strip will ensure that the secondary conduit is properly position post inversion of the secondary conduit CIPP liner.

Secondary conduit 15 forming material of the desired size and material, typically any flexible conduit material capable of withstanding high pressures and high heat temperatures which is nonreactive to the impregnation chemistry of liner, is pressurized. Conduit 15 is pressurized to preferably at least 8–10 times the pressure of the desired inflation head water pressure on the liner at the 'turn back end' to be utilized during the curing phase of the liner. The secondary conduit is fully inflated preferably using air pressure. The inflated secondary conduit 15 is then anchored to the reinforcement strip using dry felt strip wide enough to hold the secondary conduit and heat bonded on the reinforcement strip. The width of the anchoring strip can be 1" or greater. The interval of anchoring strip is typically from one foot or greater noting that the liner should not be prevented from inverting because of extra layers of felts. These strips are anchoring over secondary conduit on the reinforcement strips, holding the secondary conduit in the desired position. The anchoring strips are bonded, for example, to provide an annular space around the secondary conduit for expansion during the inflation phase after the liner assembly is inverted on the reinforcement strip.

The air pressure used to inflate the secondary conduit is then released after securing all anchor loops by bonding the enforcement strip. It is important to note that the length of the secondary conduit is longer than the liner, so that it projects beyond the edge of the liner. A pull-in tape may be utilized to aid in the inversion process. A coated layer is wrapped over the secondary conduit (which is now flat as the air pressure inside the secondary has been released) and anchor strips, fully enclosing the secondary conduit. The coated layer is attached to the other layers, such as by stitching using strong thread and uniform stitching pattern. Once the secondary conduit(s) are secured to the liner, the installation of the liner into an existing line for resin impregnation and curing can be undertaken.

Impregnation of the secondary conduit liner 15 is preferably with a thermal setting polyester resin that provides a calculated 20% to 25% increase in resin over that which would be used if the liner had only a first conduit. The exposed ends of the secondary conduit are sealed air-tight and the resin mix is pumped into the secondary conduit and liner. Resin, with required percentage of chemicals such as Triganox®, Percadox-16®, styrene etc., is pumped into the liner (after the air inside the secondary conduit is evacuated by means of a vacuum pumps and hoses) to fill all the voids created or existing in the structure. The extra resin mix is taken into account to fill the gap, anticipating a void or annular space, between the felt layers above and below the secondary conduit after inflation. By forcing excess resin into the liner, the liner becomes a complete monolithic structure without any voids or annular space, hence preventing any weak or structurally unstable areas (or regions).

When the liner is completely filled with the thermal setting polyester resin, it is engaged with a gauge roller (pinch) of a conveyor at a predetermined gap setting to ensure uniform distribution of resin mix over the required length of the liner. A vacuum of at least 24" Hg is preferably maintained inside of the liner during the impregnation and pinch roller processes to allow a uniform flow of resin mix within the liner. Upon completion of the impregnation process the liner is prepared for field installation into the host pipe by properly placing it inside a temperature controlled storage vehicle.

After attaching the liner to an orientation mandrel, the pull-in tape may be attached to a rope, which has been strung through the host pipe for qualified technicians to install. Once the liner reaches the inversion terminus or the end point, the secondary conduit is removed from its position between the coated layer and the combination of reinforcement strip and the uncoated layers saturated with resin mix are capped. The insertion end of the secondary conduit is then attached to a constant compressed air supply and regulated to a required internal pressure such that the shape of the secondary conduit shall be as desired after the liner is cured. The liner is processed according to the standards for the chemistries used. After its inversion and curing, the design thickness of the liner is uniform. Any process water is drained and the end of the liner is properly trimmed. All existing service connections are robotically reinstated. The section is now available to transport normal flow and the secondary conduit is ready to serve its intended purpose.

Figure 4:
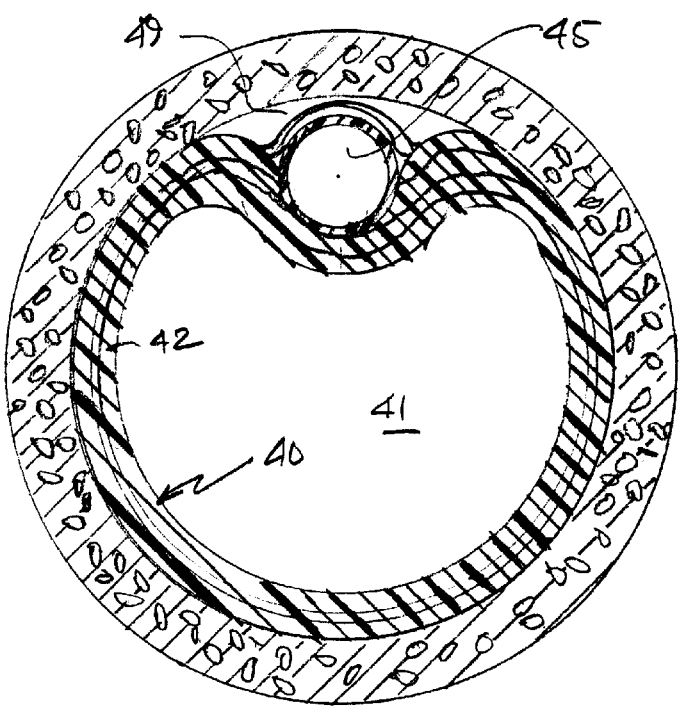
FIG. 4 is a cross-sectional elevation of a secondary conduit positioned on the outside of the arcuate sidewall of a first conduit using CIPP.

Referring to FIG. 4, another embodiment is shown in which secondary conduit 45 is positioned externally of first conduit 4.0. In this embodiment, secondary conduit 45 comprises a rigid pipe attached to liner 42 by means of strapping 49 which may comprise impregnated adsorbent material as described above which is impregnated and cured in place. Alternatively, a semi-rigid or flexible hosing material may be used for secondary conduit 45 and inflated as described above after insertion of first conduit 40 and subsequent curing.

While presently preferred embodiments of the invention have been shown and described, the invention maybe otherwise embodied within the scope of the appended claims.

What is claimed is:

1. A secondary conduit for a transmission carrier comprising at least one first arcuate sidewall defining an elongated first conduit, said first arcuate sidewall comprising of at least two layers of adsorbent material, said first conduit providing a means for conveying a fluid, at least one second conduit positioned between said at least two layers of adsorbent material, said second conduit being coextensive with said first conduit to define a secondary conduit adapted to receive a transmission carrier.

2. A secondary conduit as set forth in claim 1 wherein said first and second conduits are coextruded with one of concrete, polyethylene, polystyrene and like polymeric materials.

3. A secondary conduit as set forth in claim 1 wherein said second conduit comprises an elongated tube formed of a material different from said first arcuate wall.

4. A secondary conduit as set forth in claim 1 wherein said secondary conduit includes three second conduits.

5. A secondary conduit as set forth in claim 1 wherein said first arcuate sidewall comprises a substantially circular cross-section formed by a cured in place polymer in adsorbent fibers.

* * * * *